US010310806B2

(12) United States Patent
Kodama

(10) Patent No.: US 10,310,806 B2
(45) Date of Patent: Jun. 4, 2019

(54) COMPUTER-READABLE PROGRAM, AUDIO CONTROLLER, AND WIRELESS AUDIO SYSTEM

(71) Applicant: D&M Holdings, Inc., Kanagawa (JP)

(72) Inventor: Sho Kodama, Kanagawa (JP)

(73) Assignee: D&M Holdings, Inc., Kanagawa (JP)

( * ) Notice: Subject to any disclaimer, the term of this patent is extended or adjusted under 35 U.S.C. 154(b) by 0 days.

(21) Appl. No.: 15/760,419

(22) PCT Filed: Mar. 15, 2016

(86) PCT No.: PCT/JP2016/058069
§ 371 (c)(1),
(2) Date: Mar. 15, 2018

(87) PCT Pub. No.: WO2017/047133
PCT Pub. Date: Mar. 23, 2017

(65) Prior Publication Data
US 2018/0253276 A1 Sep. 6, 2018

(30) Foreign Application Priority Data

Sep. 18, 2015 (JP) .................. 2015-186052

(51) Int. Cl.
*H03G 3/32* (2006.01)
*G06F 3/16* (2006.01)
(Continued)

(52) U.S. Cl.
CPC ............ *G06F 3/165* (2013.01); *G10K 15/00* (2013.01); *H04R 1/06* (2013.01); *H04R 3/04* (2013.01);
(Continued)

(58) Field of Classification Search
CPC .... H04R 2499/11; H04N 7/142; H04N 5/232; H04S 7/302; H04S 7/303; G06F 1/1686;
(Continued)

(56) References Cited

U.S. PATENT DOCUMENTS 7,987,294 B2   7/2011  Bryce et al.
2005/0069154 A1* 3/2005 Yamazaki ................ H03G 3/32
                                                              381/104
(Continued)

FOREIGN PATENT DOCUMENTS

JP   2006-270522   10/2006
JP   2014-150429   8/2014
WO   2008/001857   3/2008

*Primary Examiner* — George C Monikang
(74) *Attorney, Agent, or Firm* — Peter A. Nieves; Sheehan Phinney Bass & Green PA

(57) ABSTRACT

To provide a technology capable of changing an output characteristic of music data more efficiently with a simpler operation irrespective of whether or not the music data is being played back, an audio controller (2) identifies a usage environment of a wireless speaker (1) from picked-up image data on an installation room of the wireless speaker (1). Then, an output characteristic suitable for the identified usage environment is selected, and the selected output characteristic is set as an output characteristic of music data to be output from the wireless speaker (1). In this case, a ratio between a width of a wall behind the wireless speaker (1) and a width of the speaker is obtained from the picked-up image data obtained by picking up an image of the installation room of the wireless speaker (1) so that boundaries between the wall behind the wireless speaker (1) and both sides thereof are aligned with both edges of an angle of view, and a size of the installation room of the wireless speaker (1) is identified based on this ratio to be used as the usage environment. Further, an installation position of the speaker is identified based on a display position of the speaker in the
(Continued)

picked-up image data to be also used as the usage environment.

11 Claims, 7 Drawing Sheets

(51) Int. Cl.
  *G10K 15/00* (2006.01)
  *H04R 1/06* (2006.01)
  *H04R 3/04* (2006.01)
  *H04R 3/12* (2006.01)
(52) U.S. Cl.
  CPC .......... *H04R 3/12* (2013.01); *H04R 2227/005* (2013.01); *H04R 2420/07* (2013.01)
(58) Field of Classification Search
  CPC ........... G06F 1/1694; G06F 2200/1637; G06F 3/165; H04M 1/72569
  USPC ...................................... 381/303, 306, 56–59
  See application file for complete search history.

(56) References Cited

U.S. PATENT DOCUMENTS

2013/0329921 A1* 12/2013 Salsman ................ H04S 7/303
                                                                    381/303
2015/0104050 A1*  4/2015 Harrison ................ H04S 7/301
                                                                    381/303

* cited by examiner

FIG. 2
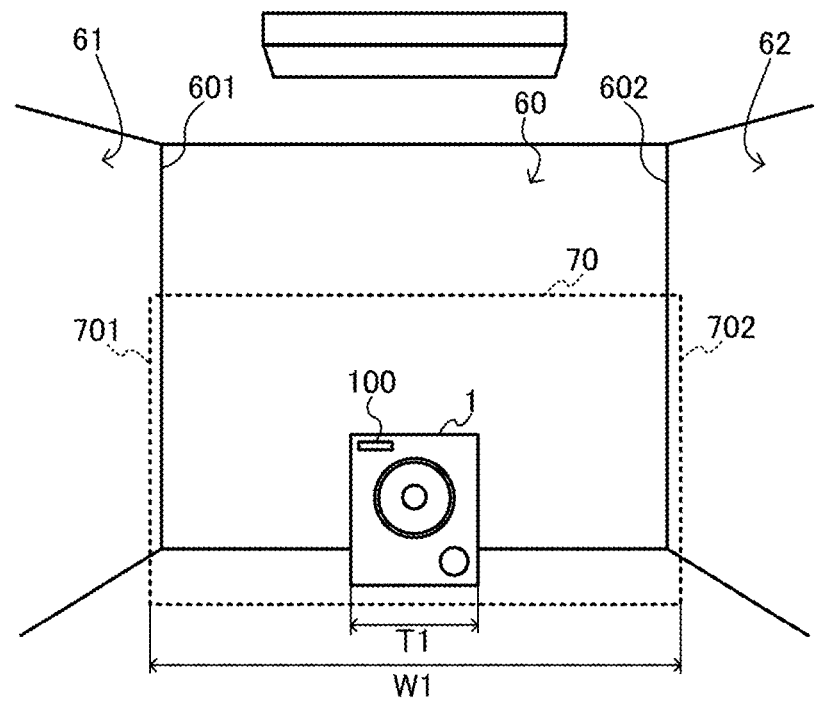
(A)
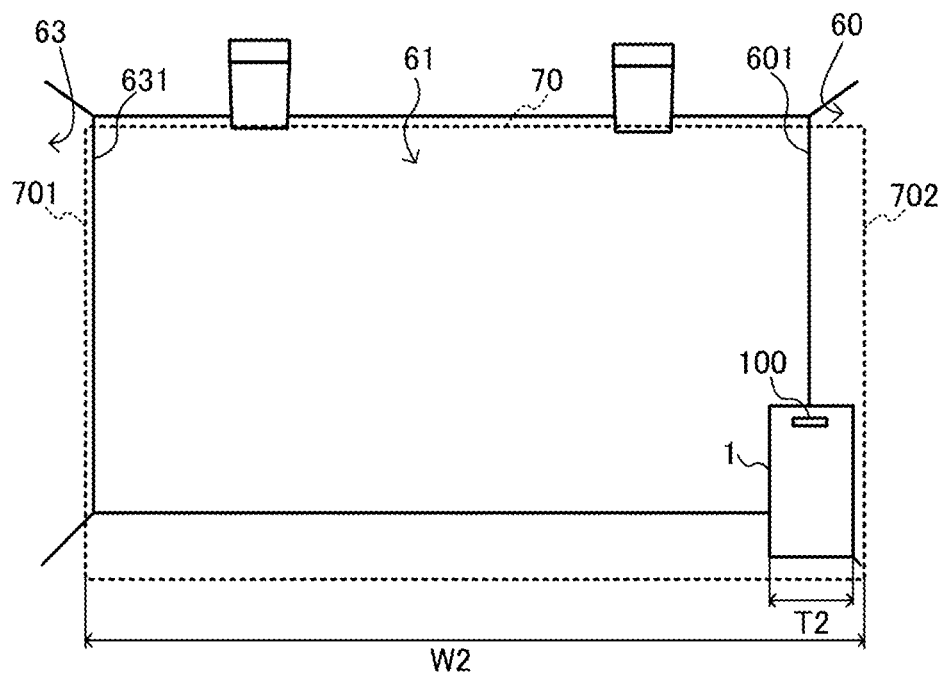
(B)

FIG. 6

OUTPUT CHARACTERISTIC STORAGE UNIT 26

ID: 1-1

| | USAGE ENVIRONMENT | | OUTPUT CHARACTERISTIC | | | |
|---|---|---|---|---|---|---|
| | SIZE | INSTALLATION POSITION | VOLUME LEVEL | ACOUSTIC CHARACTERISTIC | | SOUND FIELD EFFECT |
| | | | | HIGH-FREQUENCY RANGE / MID-FREQUENCY RANGE / LOW-FREQUENCY RANGE | | |
| | LARGE | CORNER | −3dB | 0dB, 0dB, 0dB | | NONE |
| | LARGE | CENTER | −6dB | 0dB, 3dB, 3dB | | NONE |
| | MEDIUM | CORNER | −6dB | 0dB, 0dB, 0dB | | WEAK |
| | MEDIUM | CENTER | −9dB | 0dB, 1dB, 3dB | | WEAK |
| | SMALL | CORNER | −9dB | 0dB, 0dB, 0dB | | STRONG |
| | SMALL | CENTER | −12dB | 0dB, 0dB, 3dB | | STRONG |

263 — 261, 264 — 265 — 262, 266 — 267, 260
268 (sound field effect column)

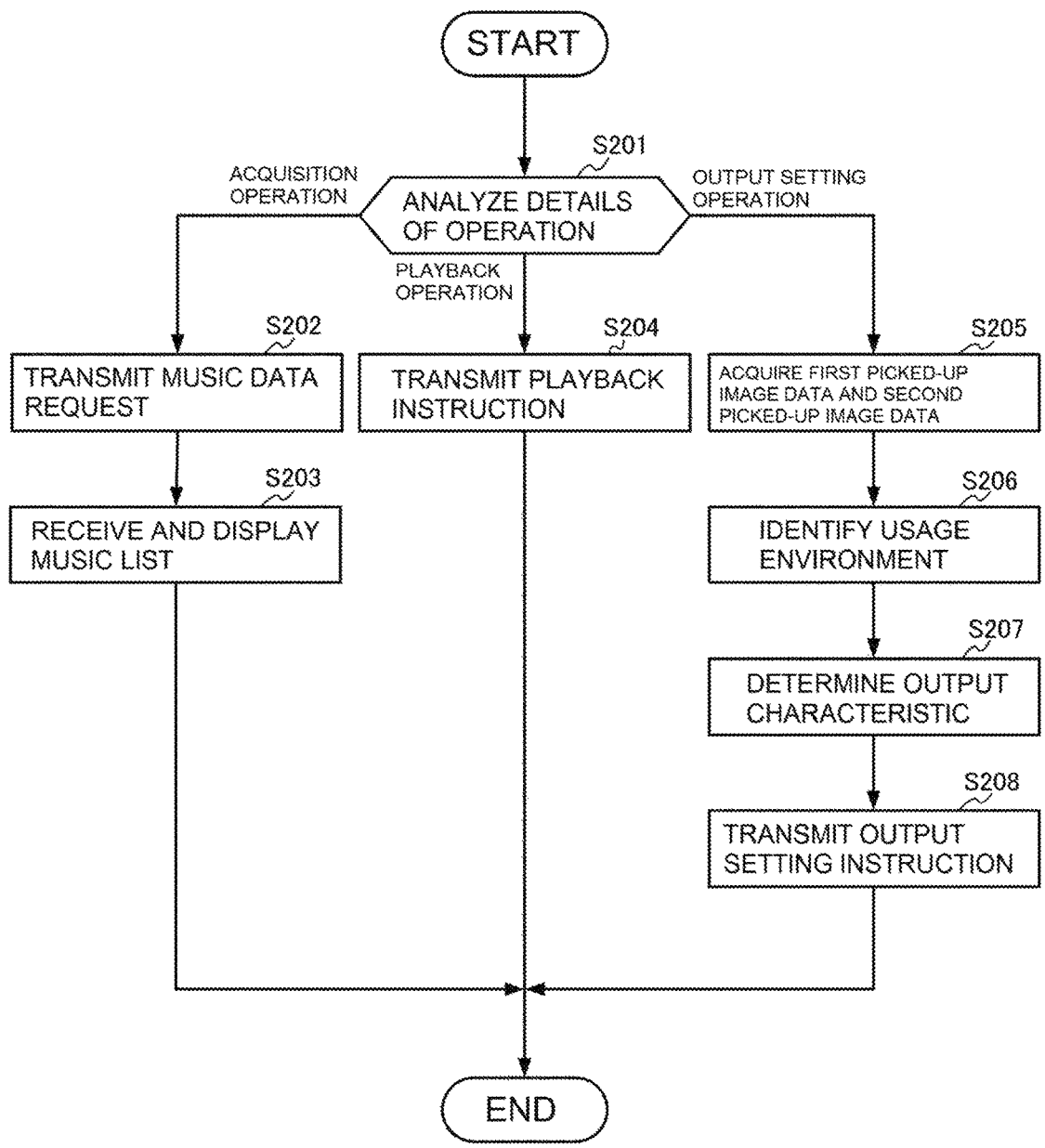

COMPUTER-READABLE PROGRAM, AUDIO CONTROLLER, AND WIRELESS AUDIO SYSTEM

CROSS-REFERENCE TO RELATED APPLICATIONS

This application is the National Stage of International Application No. PCT/JP2016/058069, filed Mar. 15, 2016, which claims the benefit of Japanese Patent Application No. 2015-186052, filed Sep. 18, 2015, The contents of these prior applications are incorporated by reference herein in their entirety.

TECHNICAL FIELD

The present invention relates to a technology of controlling an output characteristic of an audio device.

BACKGROUND ART

In Patent Literature 1, there is disclosed a wireless audio system, which includes a plurality of wireless speakers grouped into a plurality of groups, and is capable of playing back music data that is different for each group. In the wireless audio system, for each group, the plurality of wireless speakers belonging to the group perform arbitration to select one wireless speaker from among those wireless speakers. Then, the selected wireless speaker serves as a group leader to receive from a user an operation for the plurality of wireless speakers belonging to the same group and transmit a control signal to those wireless speakers. With this wireless audio system, for example, when a plurality of wireless speakers are installed in a plurality of rooms, and the wireless speakers installed in the same room are set as belonging to the same group, music data that is different for each room can be played back.

Incidentally, an output characteristic (including volume level, acoustic characteristic, and sound field effect) of a playback signal of music data is generally set to a suitable output characteristic by a user via an audio controller. In this case, how the music data output from a speaker sounds like depends on a usage environment of the speaker including a size of a room in which the speaker is installed and an installation position of the speaker in the room. This requires the user to search for a suitable output characteristic while listening to the music data output from the speaker. In particular, with the wireless audio system described in Patent Literature 1, the usage environment of the speaker is different for each group. This requires the user to search for a suitable output characteristic for each group, which is troublesome.

Meanwhile, in Patent Literature 2, there is disclosed an acoustic device capable of automatically selecting and applying an acoustic (frequency) characteristic optimum for the usage environment of a speaker. In this acoustic device, a test signal is output from a speaker for each channel and collected by a microphone. Then, the collected sound data is analyzed for each frequency, and an optimum acoustic characteristic is selected from results of the analysis for each channel.

CITATION LIST

Patent Literature

[PTL 1] U.S. Pat. No. 7,987,294 B2
[PTL 2] JP 2014-150429 A

SUMMARY OF INVENTION

Technical Problem

However, in the acoustic device described in Patent Literature 2, it is impossible to play back music data while a test signal is being played back, and it is required to wait for the playback of the music data until the playback of test signals has been finished for all channels.

It is also impossible to change an output characteristic while music data is being played back. This leads to a problem that the acoustic device exhibits poor usability particularly in a usage environment of a speaker in which an installation position of the speaker or an installation room of the speaker is frequently changed, for example, in a case of using a wireless speaker that can be moved with ease.

The present invention has been made in view of the above-mentioned circumstances, and it is an object of the present invention to provide a technology capable of changing an output characteristic of music data more efficiently with a simpler operation irrespective of whether or not the music data is being played back.

Solution to Problem

In order to solve the above-mentioned problem, according to one embodiment of the present invention, a usage environment of a speaker is identified from picked-up image data on an installation area of the speaker. Then, an output characteristic suitable for the identified usage environment is selected, and the selected output characteristic is set as an output characteristic of music data to be output from the speaker. For example, a ratio between a width of a wall behind the speaker and a width of the speaker may be obtained from the picked-up image data on the installation area of the speaker, in which boundaries on both sides of the wall behind the speaker are aligned with both edges of an angle of view, and a size of the installation area of the speaker may be identified based on this ratio to be used as the usage environment of the speaker. Further, an installation position of the speaker within the installation area may be identified based on a display position of the speaker in the picked-up image data to be used as the usage environment of the speaker.

For example, according to one embodiment of the present invention, there is provided a program readable by a computer, for causing the computer to function as an audio controller including:

output characteristic storage means for storing an output characteristic of a playback signal for each usage environment of a speaker;

picked-up image data acquisition means for acquiring picked-up image data on an installation area of the speaker, which includes the speaker;

usage environment identification means for identifying the usage environment of the speaker based on the picked-up image data acquired by the picked-up image data acquisition means; and output characteristic determination means for determining an output characteristic stored in the output characteristic storage means in association with the usage environment identified by the usage environment identification means, as an output characteristic of the playback signal to be output from the speaker.

In this case, the picked-up image data acquisition means may configured to acquire picked-up image data on the installation area of the speaker, in which boundaries on both sides of a wall behind the speaker are aligned with both edges of an angle of view, and the usage environment identification means may configured to obtain a ratio between a width of the wall behind the speaker and a width of the speaker from the picked-up image data, and to identify, as the usage environment of the speaker, a size of the installation area of the speaker based on the ratio. In another case, the usage environment identification means may be configured to identify an installation position of the speaker within the installation area based on a display position of the speaker in the picked-up image data.

Further, the picked-up image data acquisition means may be configured to acquire picked-up image data on an installation area of the speaker by picking up an image of the installation area through use of a camera function of the computer.

Further, the audio controller may further include output characteristic transmission means for transmitting the output characteristic identified by the output characteristic determination means to a predetermined audio device, for example, a wireless speaker having an audio playback function.

Advantageous Effects of Invention

According to the present invention, the usage environment of a speaker is identified from the picked-up image data on the installation area of the speaker, and the output characteristic suitable for the identified usage environment is set as the output characteristic of the playback signal of music data to be output from the speaker. Thus, the user is allowed to set the output characteristic of the playback signal of the music data without the need to take much time only by picking up an image of the installation area of the speaker. Therefore, according to the present invention, it is possible to change the output characteristic of the music data more efficiently with a simpler operation irrespective of whether or not the music data is being played back.

BRIEF DESCRIPTION OF DRAWINGS

FIG. 2(A) and FIG. 2(B) are diagrams for illustrating a method of identifying a usage environment of a wireless speaker 1 from picked-up image data on an installation room of the wireless speaker 1.

FIG. 6 is a table for schematically showing an example of content registered in an output characteristic storage unit 26.

FIG. 7 is a flowchart for illustrating an operation of the audio controller 2.

DESCRIPTION OF EMBODIMENTS

Figure 1:
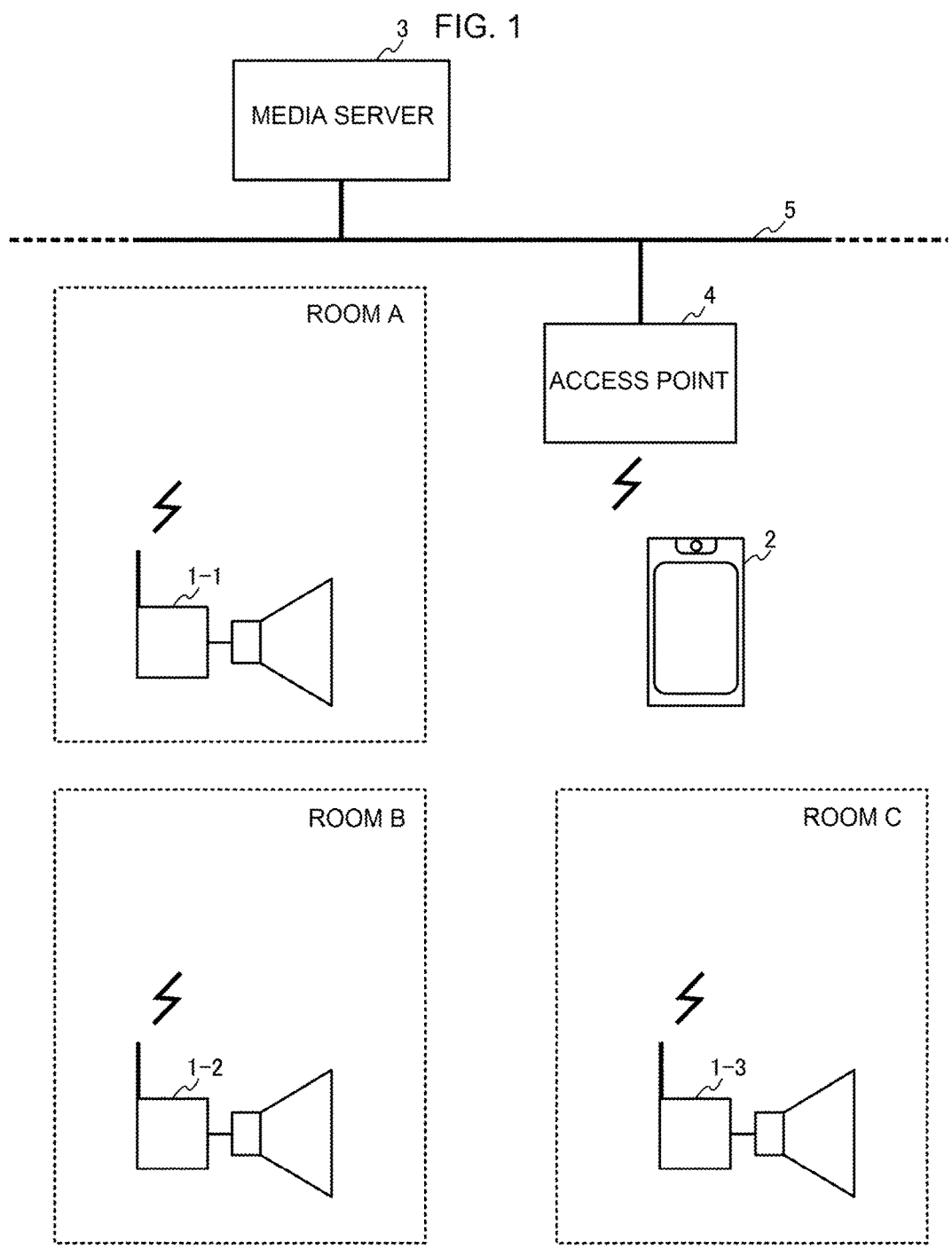
FIG. 1 is a schematic configuration diagram of a wireless audio system according to one embodiment of the present invention.

Now, an embodiment of the present invention is described referring to the drawings.

FIG. 1 is a schematic configuration diagram of a wireless audio system according to this embodiment.

As illustrated in FIG. 1, the wireless audio system according to this embodiment includes a plurality of wireless speakers 1-1 to 1-3 (hereinafter sometimes referred to simply as "wireless speaker(s) 1") each having an ID assigned thereto, an audio controller 2, which is a portable terminal having a camera function, and a media server 3 and an access point 4, which are connected to a network 5. It is assumed that the wireless speakers 1-1 to 1-3 are installed in individual rooms A to C, respectively.

Each of the wireless speakers 1 is connected to the audio controller 2 and the media server 3 via the access point 4, and acquires music data from the media server 3 and plays back the music data for output in accordance with a playback instruction received from the audio controller 2. Each of the wireless speakers 1 also sets an output characteristic of a playback signal of music data in accordance with an output setting instruction received from the audio controller 2.

The audio controller 2 is also connected to the wireless speaker 1 and the media server 3 via the access point 4, and transmits the playback instruction, which includes designation of music data selected by a user from among pieces of music data stored in the media server 3, to one of the wireless speakers 1 from which the music data is to be output (hereinafter referred to as "output destination wireless speaker 1"). Further, the audio controller 2 identifies a usage environment of the wireless speaker 1 from picked-up image data on an installation room of the wireless speaker 1, and transmits the output setting instruction, which includes designation of an output characteristic suitable for the identified usage environment, to the wireless speaker 1.

FIG. 2(A) and FIG. 2(B) are diagrams for illustrating a method of identifying the usage environment of the wireless speaker 1 from the picked-up image data on the installation room of the wireless speaker 1.

In this embodiment, first picked-up image data obtained by picking up an image of the installation room of the wireless speaker 1 from the front of the wireless speaker 1 and second picked-up image data obtained by picking up an image of the installation room of the wireless speaker 1 from a side surface of the wireless speaker 1 are used to identify a size of the installation room of the wireless speaker 1 and an installation position of the wireless speaker 1 as the usage environment of the wireless speaker 1.

First, as illustrated in FIG. 2(A), the user uses a camera function of the audio controller 2 to pick up an image of the wireless speaker 1 from the front of the wireless speaker 1 so that boundaries 601 and 602 between a wall 60 behind the wireless speaker 1 and walls 61 and 62 on both sides thereof are aligned with both edges 701 and 702 of an angle of view 70. With this operation, the audio controller 2 acquires the first picked-up image data. In this case, a label 100 uniquely provided to the wireless speaker 1 is attached on a front surface of the wireless speaker 1.

The audio controller 2 subjects the first picked-up image data to image recognition processing to identify the label 100, and to identify an outline of the wireless speaker 1 on which the label 100 is attached. Then, a width (number of pixels) T1 of the wireless speaker 1 is detected from the identified outline, and a ratio W1/T1 between a width (number of pixels) W1 of the first picked-up image data and the detected width T1 is calculated. After that, a size (large, medium, or small) of a width of the wall 60 behind the wireless speaker 1 is identified as a size of a width of the installation room of the wireless speaker 1 based on the calculated ratio W1/T1. For example, the size of the width of the installation room of the wireless speaker 1 is set to "large" when the ratio W1/T1 is equal to or larger than 10, is set to "medium" when the ratio W1/T1 is smaller than 10 and equal to or larger than 5, and is set to "small" when the ratio W1/T1 is smaller than 5. In addition, a position (center or corner) of the wireless speaker 1 with respect to the width of the installation room is identified based on a display position of the wireless speaker 1 in the first picked-up image data. For example, in a case where the first picked-up image data is divided into four areas along a width W1 direction, the position of the wireless speaker 1 with respect to the width of the installation room is set to "center" when the wireless speaker 1 is present within central two areas, and is set to "corner" when the wireless speaker 1 is present within the other areas.

Next, as illustrated in FIG. 2(B), the user uses the camera function of the audio controller 2 to pick up an image of the wireless speaker 1 so that boundaries 631 and 601 between the wall 61 beside the wireless speaker 1 and walls 63 and 60 on both sides thereof are aligned with both edges 701 and 702 of an angle of view 70. With this operation, the audio controller 2 acquires the second picked-up image data. In this case, the label 100 is also attached on a side surface of the wireless speaker 1. The audio controller 2 subjects the second picked-up image data to image recognition processing to identify the label 100, and to identify the outline of the wireless speaker 1 on which the label 100 is attached. Then, a width (number of pixels) T2 of the wireless speaker 1 is detected from the identified outline, and a ratio W2/T2 between a width (number of pixels) W2 of the second picked-up image data and the detected width T2 is calculated. After that, a size (large, medium, or small) of a width of the wall 61 beside the wireless speaker 1 is identified as a size of a depth of the installation room of the wireless speaker 1 based on the calculated ratio W2/T2. For example, the size of the depth of the installation room of the wireless speaker 1 is set to "large" when the ratio W2/T2 is equal to or larger than 10, is set to "medium" when the ratio W2/T2 is smaller than 10 and equal to or larger than 5, and is set to "small" when the ratio W2/T2 is smaller than 5. In addition, a position (center or corner) of the wireless speaker 1 with respect to the depth of the installation room is identified based on a display position of the wireless speaker 1 in the second picked-up image data. For example, in a case where the second picked-up image data is divided into four areas along a width W2 direction, the position of the wireless speaker 1 with respect to the depth of the installation room is set to "center" when the wireless speaker 1 is present within central two areas, and is set to "corner" when the wireless speaker 1 is present within the other areas.

The audio controller 2 identifies the size of the installation room of the wireless speaker 1 based on the sizes of the width and the depth of the installation room of the wireless speaker 1, which have been identified in the above-mentioned manner. For example, the size of the installation room of the wireless speaker 1 is set to "large" when the sizes of the width and the depth are both "large", is set to "small" when the sizes are both "small", and is set to "medium" in the other case. Further, similarly, the installation position of the wireless speaker 1 within the room is identified based on the positions of the wireless speaker 1 with respect to the width and the depth of the installation room, which have been identified in the above-mentioned manner. For example, the installation position of the wireless speaker 1 within the room is set to "center" when the positions with respect to the width and the depth of the installation room are both "center", and is set to "corner" in the other case.

Next, details of the wireless speaker 1 and the audio controller 2 of the wireless audio system according to this embodiment are described. An existing media server and access point can be used as the media server 3 and the access point 4, and hence detailed descriptions thereof are omitted.

First, the wireless speaker 1 is described.

Figure 3:
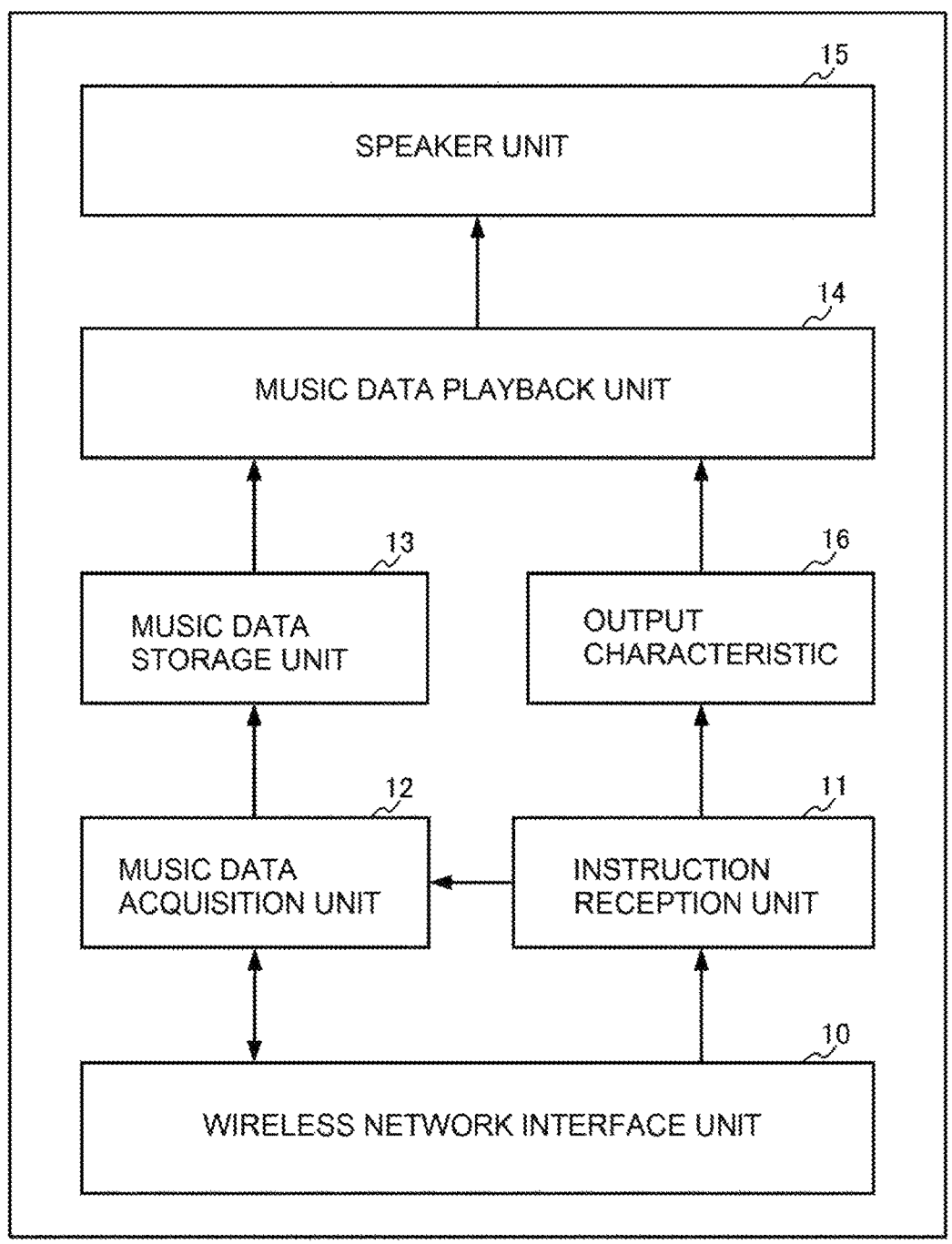
FIG. 3 is a schematic functional configuration diagram of the wireless speaker 1.

FIG. 3 is a schematic functional configuration diagram of the wireless speaker 1. A functional configuration of the wireless speaker 1 illustrated in FIG. 3 is, for example, implemented in the following manner: in a computer including a CPU, a memory, an auxiliary storage device, for example, a flash memory, a wireless communication device, for example, a wireless LAN adapter, and a speaker, the CPU loads a predetermined program onto the memory from the auxiliary storage device to execute the program.

As illustrated in FIG. 3, the wireless speaker 1 includes a wireless network interface unit 10, an instruction reception unit 11, a music data acquisition unit 12, a music data storage unit 13, a music data playback unit 14, a speaker unit 15, and an output characteristic setting unit 16.

The wireless network interface unit 10 is an interface for, for example, communicating to/from the audio controller 2 and communicating to/from the media server 3 connected to the network 5 via the access point 4.

The instruction reception unit 11 receives various instructions each assigned with the ID of the own wireless speaker 1 from the audio controller 2 via the wireless network interface unit 10. When the received instruction is the playback instruction involving the designation of the music data, the instruction reception unit 11 passes an acquisition instruction including the designation of the music data designated in the playback instruction to the music data acquisition unit 12. Further, when the received instruction is an output setting instruction including the designation of a volume level, an acoustic (frequency) characteristic, and a sound field effect, the instruction reception unit 11 passes the output setting instruction to the output characteristic setting unit 16.

When receiving the acquisition instruction from the instruction reception unit 11, the music data acquisition unit 12 transmits a music data request including the designation of the music data designated in the acquisition instruction to the media server 3 via the wireless network interface unit 10, and acquires the music data to be acquired from the media server 3.

The music data storage unit 13 stores the music data acquired by the music data acquisition unit 12 from the media server 3.

The music data playback unit 14 plays back the music data stored in the music data storage unit 13 in accordance with the volume level, the acoustic characteristic, and the sound field effect, which have been set by the output characteristic setting unit 16, to output the music data from the speaker unit 15.

When receiving the output setting instruction from the instruction reception unit 11, the output characteristic setting unit 16 sets the volume level, the acoustic characteristic, and the sound field effect, which are designated in the output setting instruction, in the music data playback unit 14.

Figure 4:
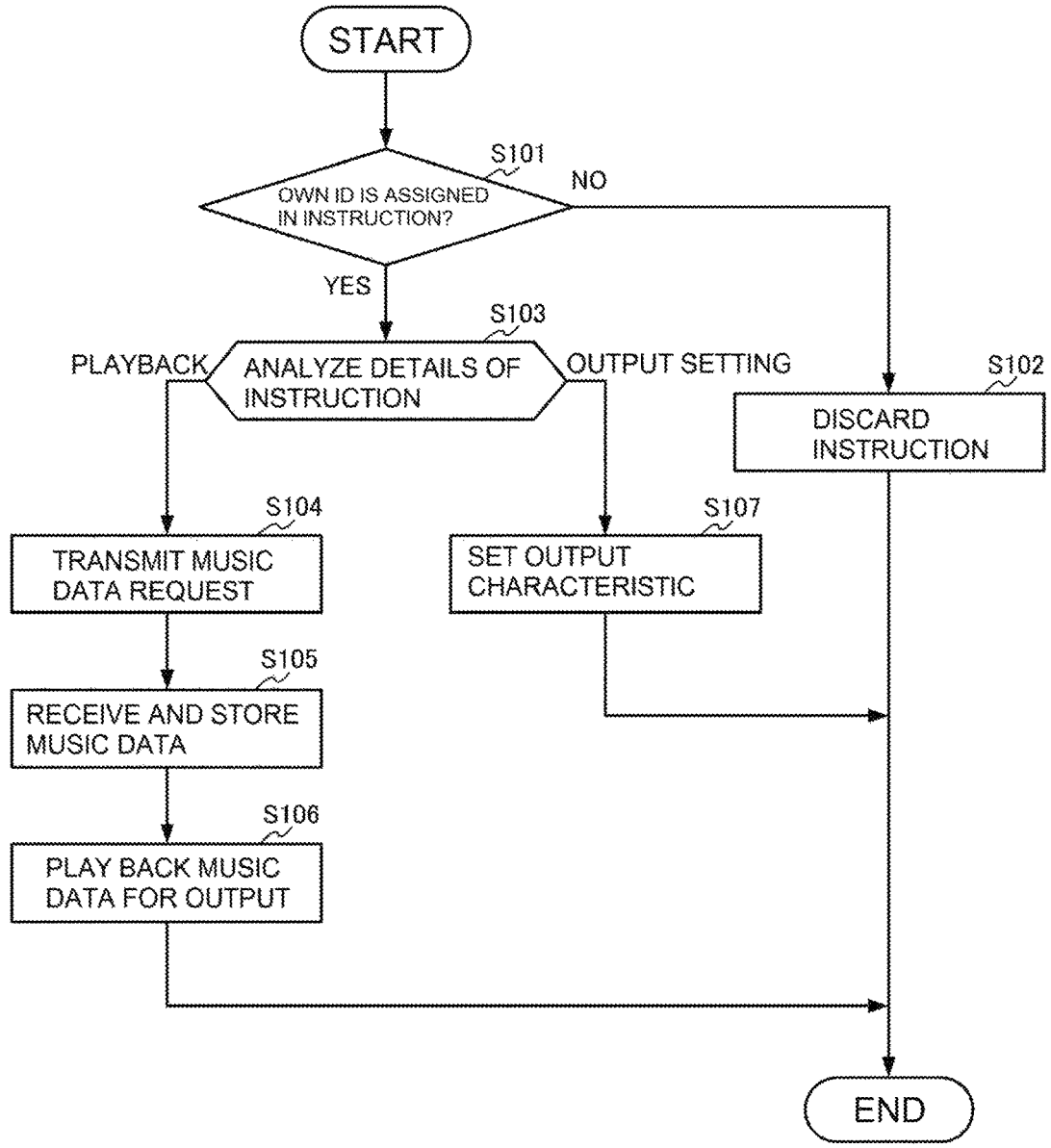
FIG. 4 is a flowchart for illustrating an operation of the wireless speaker 1.

FIG. 4 is a flowchart for illustrating an operation of the wireless speaker 1. This flow is started when the wireless network interface unit 10 receives an instruction multicast from the audio controller 2.

First, the wireless network interface unit 10 determines whether or not an ID of the own wireless speaker 1 is assigned in the received instruction (Step S101).

When the ID of the own wireless speaker 1 is not assigned (NO in Step S101), the wireless network interface unit 10 discards this instruction (Step S102), and ends the processing.

Meanwhile, when the ID of the own wireless speaker 1 is assigned, the wireless network interface unit 10 passes this instruction to the instruction reception unit 11. In response to this instruction, the instruction reception unit 11 determines which of the playback instruction and the output setting instruction the instruction received from the wireless network interface unit 10 is (Step S103).

When the instruction received from the wireless network interface unit 10 is the playback instruction ("PLAYBACK" in Step S103), the instruction reception unit 11 passes the acquisition instruction including the designation of the music data designated in this playback instruction to the music data acquisition unit 12.

When receiving the acquisition instruction from the instruction reception unit 11, the music data acquisition unit 12 transmits, to the media server 3 via the wireless network interface unit 10, a music data request including the designation of the music data designated in this acquisition instruction (Step S104). When receiving the music data from the media server 3, the music data acquisition unit 12 stores the music data in the music data storage unit 13 (Step S105). In response to this, the music data playback unit 14 plays back the music data stored in the music data storage unit 13 in accordance with the volume level, the acoustic characteristic, and the sound field effect, which have been set by the output characteristic setting unit 16, to output the music data from the speaker unit 15 (Step S106).

Meanwhile, when the instruction received from the wireless network interface unit 10 is the output setting instruction ("OUTPUT SETTING" in Step S103), the volume level, the acoustic characteristic, and the sound field effect, which are designated in this output setting instruction, are set in the music data playback unit 14 (Step S107). In response to this, from this time on, the music data playback unit 14 plays back the music data stored in the music data storage unit 13 in accordance with the volume level, the acoustic characteristic, and the sound field effect that have been newly set by the output characteristic setting unit 16, to output the music data from the speaker unit 15.

Next, the audio controller 2 is described.

Figure 5:
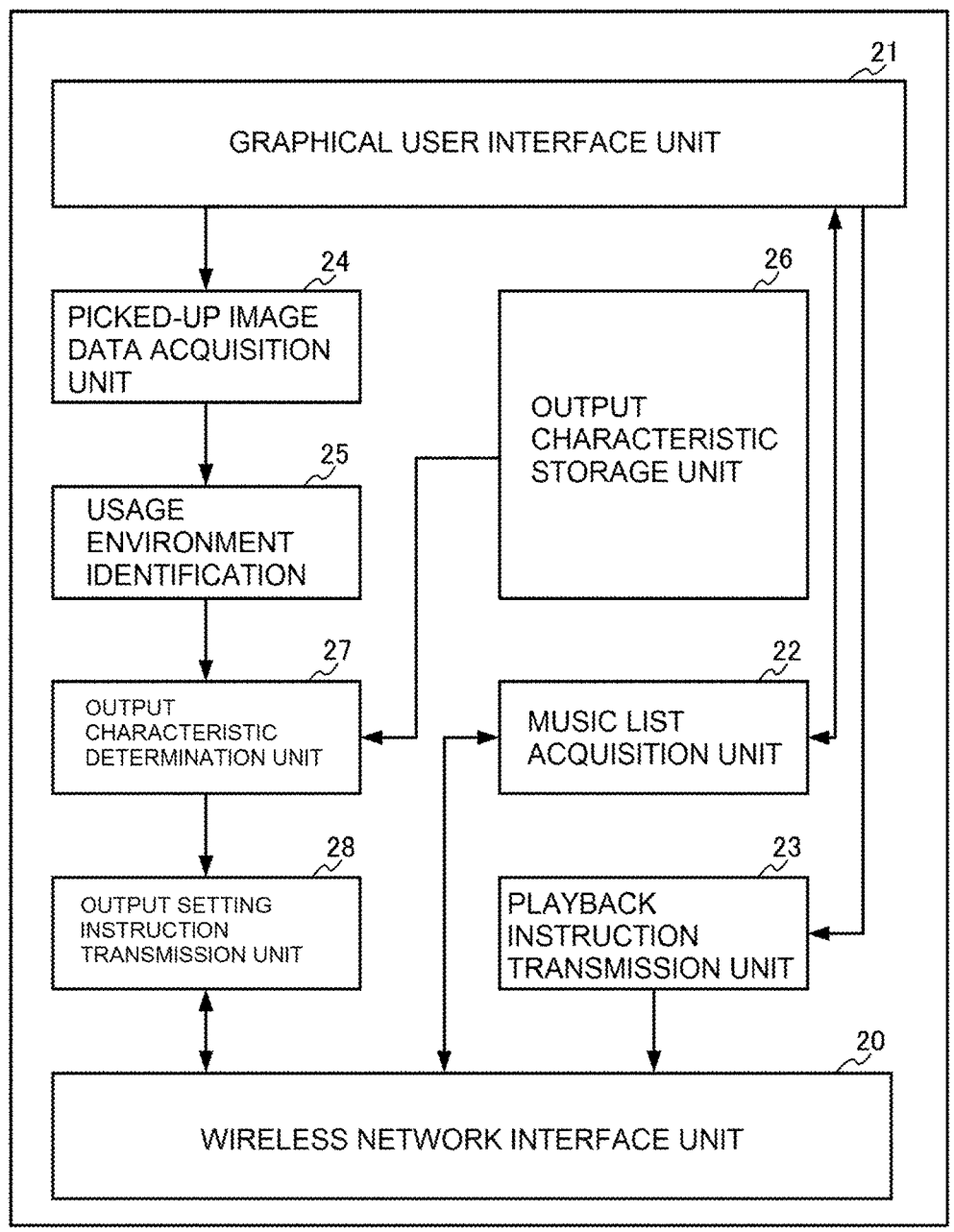
FIG. 5 is a schematic functional configuration diagram of an audio controller 2.

FIG. 5 is a schematic functional configuration diagram of the audio controller 2. The functional configuration of the audio controller 2 illustrated in FIG. 5 is, for example, implemented in the following manner: in a portable computer, for example, a smartphone or a tablet PC, which includes a CPU, a memory, an auxiliary storage device, for example, a flash memory, a touch panel, a display, an input/output device, for example, a pointing device, a wireless communication device, for example, a wireless LAN adapter, and a camera, the CPU loads a predetermined program onto the memory from the auxiliary storage device to execute the program.

As illustrated in FIG. 5, the audio controller 2 includes a wireless network interface unit 20, a graphical user interface unit 21, a music list acquisition unit 22, a playback instruction transmission unit 23, a picked-up image data acquisition unit 24, a usage environment identification unit 25, an output characteristic storage unit 26, an output characteristic determination unit 27, and an output setting instruction transmission unit 28.

The wireless network interface unit 20 is an interface for, for example, communicating to/from the wireless speaker 1 via the access point 4 and communicating to/from the media server 3 connected to the network 5.

The graphical user interface unit 21 is an interface for, for example, displaying information and receiving various operations from the user.

The music list acquisition unit 22 acquires a music list being a list of music data stored in the media server 3 from the media server 3 via the wireless network interface unit 20, and displays the acquired music list on the graphical user interface unit 21.

The playback instruction transmission unit 23 multicasts the playback instruction involving the designation of the music data to be played back and the ID of the output destination wireless speaker 1 from the wireless network interface unit 20.

The picked-up image data acquisition unit 24 acquires the first picked-up image data (see FIG. 2(A)) and the second picked-up image data (see FIG. 2(B)), which have been obtained by picking up the images of the installation room of the wireless speaker 1 through use of the camera function of the audio controller 2.

The usage environment identification unit 25 uses the first picked-up image data and the second picked-up image data, which have been acquired by the picked-up image data acquisition unit 24, to identify the size of the installation room of the wireless speaker 1 and the installation position of the wireless speaker 1 as the usage environment of the wireless speaker 1.

The output characteristic storage unit 26 stores information indicating a correspondence relationship between the usage environment and the output characteristic for each of the wireless speakers 1. FIG. 6 is a table for schematically showing an example of content registered in the output characteristic storage unit 26.

As shown in FIG. 6, in the output characteristic storage unit 26, a table 260 is stored in association with the ID of the wireless speaker 1 for each of the wireless speakers 1. In the table 260, for each usage environment of the wireless speaker 1, a record 268 of the output characteristic suitable for the usage environment is stored. The record 268 includes a field 261 in which a usage environment is registered and a field 262 in which an output characteristic is registered. The field 261 includes a subfield 263 in which a size of the installation room of the wireless speaker 1 is registered and a subfield 264 in which an installation position of the wireless speaker 1 is registered. The field 262 includes a subfield 265 in which a volume level is registered, a subfield 266 in which an acoustic characteristic (output level in each of a high-frequency range, a mid-frequency range, and a low-frequency range) is registered, and a subfield 267 in which a sound field effect (strong or weak in terms of phase difference between channels) is registered.

The output characteristic determination unit 27 refers to the table 260 stored in the output characteristic storage unit 26 in association with the ID of the output destination wireless speaker 1 to identify the output characteristic associated with the usage environment identified by the usage environment identification unit 25, and determines this output characteristic as the output characteristic of the output destination wireless speaker 1.

The output setting instruction transmission unit 28 multicasts the output setting instruction involving the designation of the output characteristic determined by the output characteristic determination unit 27 and the ID of the output destination wireless speaker 1 from the wireless network interface unit 20.

FIG. 7 is a flowchart for illustrating an operation of the audio controller 2. This flow is started when the graphical user interface unit 21 receives an operation from the user.

First, the graphical user interface unit 21 analyzes details of the operation received from the user (Step S201).

When the operation received from the user is an acquisition operation for the music list ("ACQUISITION OPERATION" in Step S201), the graphical user interface unit 21 notifies the music list acquisition unit 22 to that effect.

In response to this, the music list acquisition unit 22 transmits a music list request to the media server 3 via the wireless network interface unit 20 (Step S202). Then, the music list acquisition unit 22 acquires the music list of the music data stored in the media server 3 from the media server 3, and displays the acquired music list on the graphical user interface unit 21 (Step S203).

Further, when the operation received from the user is a playback operation involving the designation of the music data to be played back and the ID of the output destination wireless speaker 1 ("PLAYBACK OPERATION" in Step S201), the graphical user interface unit 21 notifies the playback instruction transmission unit 23 to that effect.

In response to this, the playback instruction transmission unit 23 generates a playback instruction involving the designation of the music data to be played back and the ID of the output destination wireless speaker 1, which have been designated by the playback operation. Then, the playback instruction transmission unit 23 multicasts this playback instruction from the wireless network interface unit 20 (Step S204).

Further, when the operation received from the user is an output setting operation involving the designation of the ID of the output destination wireless speaker 1 ("OUTPUT SETTING OPERATION" in Step S201), the graphical user interface unit 21 notifies the picked-up image data acquisition unit 24 to that effect.

In response to this, the picked-up image data acquisition unit 24 causes the user to pick up images of the installation room of the wireless speaker 1 through use of the camera function of the audio controller 2, and acquires the first picked-up image data (see FIG. 2(A)) and the second picked-up image data (see FIG. 2(B)) (Step S205). Then, the picked-up image data acquisition unit 24 passes the first picked-up image data and the second picked-up image data, which have been acquired, to the usage environment identification unit 25 together with the ID of the output destination wireless speaker 1.

Subsequently, as described above with reference to FIG. 2(A), the usage environment identification unit 25 uses the first picked-up image data received from the picked-up image data acquisition unit 24 to identify the size of the width of the installation room of the wireless speaker 1 and the position of the wireless speaker 1 with respect to the width of the installation room. Similarly, as described above with reference to FIG. 2(B), the usage environment identification unit 25 uses the second picked-up image data received from the picked-up image data acquisition unit 24 to identify the size of the depth of the installation room of the wireless speaker 1 and the position of the wireless speaker 1 with respect to the depth of the installation room. Then, as the usage environment of the wireless speaker 1, the usage environment identification unit 25 identifies the size of the installation room of the wireless speaker 1 based on the sizes of the width and the depth of the installation room of the wireless speaker 1, and identifies the installation position of the wireless speaker 1 within the room based on the positions of the wireless speaker 1 with respect to the width and the depth of the installation room (Step S206). After that, the usage environment identification unit 25 passes the usage environment of the wireless speaker 1, which has been identified in the above-mentioned manner, to the output characteristic determination unit 27 together with the ID of the output destination wireless speaker 1.

Subsequently, the output characteristic determination unit 27 uses the usage environment received from the usage environment identification unit 25 as a key to retrieve the record 268 from the table 260 stored in the output characteristic storage unit 26 in association with the ID of the output destination wireless speaker 1 received from the usage environment identification unit 25. Specifically, the output characteristic determination unit 27 retrieves the record 268 in which the size of the installation room of the wireless speaker 1 and the installation position of the wireless speaker 1, which are included in the usage environment received from the usage environment identification unit 25, are registered in the subfields 263 and 264, respectively. Then, the output characteristic determination unit 27 determines the output characteristic registered in the field 262 of the retrieved record 268 as the output characteristic of the output destination wireless speaker 1 (Step S207). Then, the output characteristic determination unit 27 passes the determined output characteristic to the output setting instruction transmission unit 28 together with the ID of the output destination wireless speaker 1.

Subsequently, the output setting instruction transmission unit 28 generates an output setting instruction involving the designation of the output characteristic received from the output characteristic determination unit 27 and the ID of the output destination wireless speaker 1. Then, the output setting instruction transmission unit 28 multicasts this output setting instruction from the wireless network interface unit 20 (Step S208).

In the above, one embodiment of the present invention has been described.

In this embodiment, the usage environment of the wireless speaker 1 is identified from the picked-up image data (first picked-up image data and second picked-up image data) on the installation room of the wireless speaker 1, and the output characteristic suitable for the identified usage environment is set as the output characteristic of the music data to be output from the wireless speaker 1. Therefore, the user is allowed to set the output characteristic of the music data only by picking up an image of the installation room of the wireless speaker 1. In this case, the output characteristic is determined without use of a test signal or the like, which enables the output characteristic of the music data to be set in a shorter period of time unlike in a related-art technology that requires much time to play back all test signals. As a result, according to this embodiment, it is possible to change the output characteristic of the music data more efficiently with a simpler operation.

Further, the test signal or the like is not used for determining the output characteristic, and hence it is possible to change the setting of the output characteristic of the music data without stopping the playback of the music data being played back, which is convenient.

The present invention is not limited to the above-mentioned embodiment, and various modifications may be made thereto within the scope of the gist of the present invention.

For example, in the embodiment described above, as illustrated in FIG. 2(A), the audio controller 2 acquires the first picked-up image data by causing the user to pick up an image of the wireless speaker 1 so that the boundaries 601 and 602 between the wall 60 behind the wireless speaker 1 and the walls 61 and 62 on both sides thereof are aligned with the both edges 701 and 702 of the angle of view 70. However, the present invention is not limited thereto. The audio controller 2 may acquire the first picked-up image data by causing the user to pick up an image of the wireless speaker 1 so that both ends of a lateral-direction width of a listening area, in which the user wishes to enjoy listening to music, are aligned with the both edges 701 and 702 of the angle of view 70.

Similarly, as illustrated in FIG. 2(B), the audio controller 2 acquires the second picked-up image data by causing the user to pick up an image of the wireless speaker 1 so that the boundaries 631 and 601 between the wall 61 beside the wireless speaker 1 and the walls 63 and 60 on both sides thereof are aligned with the both edges 701 and 702 of the angle of view 70. However, the present invention is not limited thereto. The audio controller 2 may acquire the second picked-up image data by causing the user to pick up an image of the wireless speaker 1 so that both ends of a depth-direction width of a listening area, in which the user wishes to enjoy listening to music, are aligned with the both edges 701 and 702 of the angle of view 70.

When no wall exists at least any one of behind the wireless speaker 1 or beside the wireless speaker 1, the user may input to the audio controller 2 the fact that there is no wall, and the usage environment identification unit 25 may identify the usage environment of the wireless speaker 1 as, for example, open space. With output characteristics suitable for various types of open space, for example, an outdoor place, being stored in the output characteristic storage unit 26 in advance, the output characteristic determination unit 27 can identify the output characteristic associated with the usage environment identified by the usage environment identification unit 25 from the output characteristic storage unit 26.

Further, in the embodiment described above, the size of the installation room of the wireless speaker 1 is determined from the sizes of a room width and a room depth. However, a boundary between a floor and a wall and a boundary between a ceiling and the wall may be included in any one of the first picked-up image data and the second picked-up image data, to thereby further identify a size of a ceiling height, and the size of the installation room of the wireless speaker 1 may be identified from the sizes of the room width, the room depth, and the ceiling height.

Further, in the embodiment described above, any one of the first picked-up image data and the second picked-up image data may be omitted. In this case, the usage environment of the wireless speaker 1 may be identified from a single piece of picked-up image data, or supplementary information may be received from the user via the graphical user interface unit 21 to identify the usage environment of the wireless speaker 1. In the former case, the size of the width or the depth of the installation room of the wireless speaker 1 identified from the single piece of picked-up image data is used as the size of the installation room of the wireless speaker 1, and the position of the wireless speaker 1 with respect to the width or the depth of the installation room identified from the single piece of picked-up image data is used as the installation position of the wireless speaker 1. In the latter case, information to be identified from the omitted piece of the picked-up image data is received from the user.

Further, the audio controller 2 may display the picked-up image data and the results of the image recognition processing (position of the label 100 and outline of the wireless speaker 1) so as to be superimposed on the graphical user interface unit 21, to thereby receive correction of the position of the label 100 or the outline of the wireless speaker 1 from the user. Further, the user may be allowed to designate each wall boundary on the image of the installation room of the wireless speaker 1 displayed on the graphical user interface unit 21.

Further, in the embodiment described above, the audio controller 2 receives the ID of the output destination wireless speaker 1 from the user via the graphical user interface unit 21, but the present invention is not limited thereto. The ID of the wireless speaker 1 may be acquired by, for example, attaching a QR code (trademark) representing the ID of the own wireless speaker 1 to the wireless speaker 1 as the label 100 uniquely provided to the wireless speaker 1 or separately from the label 100, and picking up an image of the QR code with the camera of the audio controller 2. As another example, the audio controller 2 and the wireless speaker 1 may be provided with a short-range wireless communication function, for example, RFID, so as to allow the wireless speaker 1 to use the short-range wireless communication to transmit the ID of the own wireless speaker 1 to the audio controller 2.

Further, in the embodiment described above, the audio controller 2 multicasts various instructions to each of the wireless speakers 1-1 to 1-3, but may be configured to unicast various instructions to each wireless speaker, for example, instead of multicasting various instructions.

Further, in the embodiment described above, the case in which the audio controller 2 is connected to the network 5 via a wireless network is taken as an example for description, but the audio controller 2 may be directly connected to the network 5 without the intermediation of a wireless network. Further, the audio controller 2 may be directly connected to the wireless speaker 1 wirelessly without the intermediation of the access point 4.

Further, in the embodiment described above, the media server 3 is connected to the network 5, but the media server 3 may be connected to a wireless network. Further, the media server 3 may be built into the audio controller 2. When the media server 3 is built into the audio controller 2, the wireless speaker 1 acquires music data from the audio controller 2. Further, when the media server 3 is built into any one of audio controllers 2, another wireless speaker 1 acquires music data from the audio controller 2 into which the media server 3 is built.

Further, in the embodiment described above, the audio controller 2 transmits the instruction to the wireless speaker 1, but the present invention is not limited thereto. The audio controller 2 is only required to transmit the instruction to a predetermined audio device having a function of playing back music data.

REFERENCE SIGNS LIST

1, 1-1 to 1-3: wireless speaker, 2: audio controller, 3: media server, 4: access point, 5: network, 10: wireless network interface unit, 11: instruction reception unit, 12: music data acquisition unit, 13: music data storage unit, 14: music data playback unit, 15: speaker unit, 16: output characteristic setting unit, 20: wireless network interface unit, 21: graphical user interface unit, 22: music list acquisition unit, 23: playback instruction transmission unit, 24: picked-up image data acquisition unit, 25: usage environment identification unit, 26: output characteristic storage unit, 27: output characteristic determination unit, 28: output setting instruction transmission unit, 100: label

The invention claimed is:

1. A program readable by a computer, for causing the computer to function as an audio controller,
the program stored on a non-volatile memory comprising:
output characteristic storage means for storing an output characteristic of a playback signal for each usage environment of a speaker;
picked-up image data acquisition means for acquiring picked-up image data on an installation area of the speaker, which includes the speaker;
usage environment identification means for identifying the usage environment of the speaker based on the picked-up image data acquired by the picked-up image data acquisition means; and
output characteristic determination means for determining an output characteristic stored in the output characteristic storage means in association with the usage environment identified by the usage environment identification means, as the output characteristic of the playback signal to be output from the speaker; wherein the picked-up image data acquisition means is configured to acquire, as first picked-up image data, picked-up image data obtained by picking up an image of the installation area of the speaker so that boundaries on both sides of a wall behind the speaker are aligned with both edges of an angle of view, and
wherein the usage environment identification means is configured to obtain a ratio between a width of the wall behind the speaker and a width of the speaker from the first picked-up image data, and to identify, as the usage environment of the speaker, a size of the installation area of the speaker based on the ratio.

2. A program readable by a computer according to claim 1,
wherein the picked-up image data acquisition means is configured to further acquire, as second picked-up image data, picked-up image data obtained by picking up an image of the installation area of the speaker so that boundaries on both sides of a wall beside the speaker are aligned with both edges of an angle of view, and
wherein the usage environment identification means is configured to further obtain a ratio between a width of the wall beside the speaker and a depth of the speaker from the second picked-up image data, and to identify, as the usage environment of the speaker, a size of the installation area of the speaker based on the ratio obtained from the second picked-up image data and the ratio obtained from the first picked-up image data.

3. A program readable by a computer according to claim 1,
wherein the picked-up image data acquisition means is configured to acquire, as first picked-up image data, picked-up image data obtained by picking up an image of the installation area of the speaker so that boundaries on both sides of a wall behind the speaker are aligned with both edges of an angle of view, and
wherein the usage environment identification means is configured to identify, as the usage environment of the speaker, an installation position of the speaker within the installation area based on a display position of the speaker in the first picked-up image data.

4. A program readable by a computer according to claim 3,
wherein the picked-up image data acquisition means is configured to further acquire, as second picked-up image data, picked-up image data obtained by picking up an image of the installation area of the speaker so that boundaries on both sides of a wall beside the speaker are aligned with both edges of an angle of view, and
wherein the usage environment identification means is configured to identify, as the usage environment of the speaker, an installation position of the speaker within the installation area based on a display position of the speaker in each of the first picked-up image data and the second picked-up image data.

5. A program readable by a computer according to claim 1, wherein the picked-up image data acquisition means is configured to acquire the picked-up image data on the installation area of the speaker by picking up an image of the installation area through use of a camera function of the computer.

6. A program readable by a computer according to claim 1, wherein the audio controller further comprises output characteristic transmission means for transmitting the output characteristic identified by the output characteristic determination means to a predetermined audio device.

7. A program readable by a computer, for causing the computer to function as an audio controller,
the program stored on a non-volatile memory comprising:
output characteristic storage means for storing an output characteristic of a playback signal for each usage environment of a speaker;
picked-up image data acquisition means for acquiring picked-up image data on an installation area of the speaker, which includes the speaker;
usage environment identification means for identifying the usage environment of the speaker based on the picked-up image data acquired by the picked-up image data acquisition means; and
output characteristic determination means for determining an output characteristic stored in the output characteristic storage means in association with the usage environment identified by the usage environment identification means, as the output characteristic of the playback signal to be output from the speaker;
wherein the picked-up image data acquisition means is configured to acquire, as first picked-up image data, picked-up image data obtained by picking up an image of the installation area of the speaker so that boundaries on both sides of a wall behind the speaker are aligned with both edges of an angle of view,
wherein the usage environment identification means is configured to obtain a ratio between a width of the wall behind the speaker and a width of the speaker from the first picked-up image data, and to identify, as the usage environment of the speaker, a size of the installation area of the speaker based on the ratio; and
wherein the picked-up image data acquisition means is configured to further acquire, as second picked-up image data, picked-up image data obtained by picking up an image of the installation area of the speaker so that boundaries on both sides of a wall beside the speaker are aligned with both edges of an angle of view, and
wherein the usage environment identification means is configured to further obtain a ratio between a width of the wall beside the speaker and a depth of the speaker from the second picked-up image data, and to identify, as the usage environment of the speaker, a size of the installation area of the speaker based on the ratio obtained from the second picked-up image data and the ratio obtained from the first picked-up image data.

8. A program readable by a computer according to claim 7,
wherein the picked-up image data acquisition means is configured to acquire, as first picked-up image data, picked-up image data obtained by picking up an image of the installation area of the speaker so that boundaries on both sides of a wall behind the speaker are aligned with both edges of an angle of view, and
wherein the usage environment identification means is configured to identify, as the usage environment of the speaker, an installation position of the speaker within the installation area based on a display position of the speaker in the first picked-up image data.

9. A program readable by a computer according to claim 8,
wherein the picked-up image data acquisition means is configured to further acquire, as second picked-up image data, picked-up image data obtained by picking up an image of the installation area of the speaker so that boundaries on both sides of a wall beside the speaker are aligned with both edges of an angle of view, and
wherein the usage environment identification means is configured to identify, as the usage environment of the speaker, an installation position of the speaker within the installation area based on a display position of the speaker in each of the first picked-up image data and the second picked-up image data.

10. A program readable by a computer according to claim 7, wherein the picked-up image data acquisition means is configured to acquire the picked-up image data on the installation area of the speaker by picking up an image of the installation area through use of a camera function of the computer.

11. A program readable by a computer according to claim 7, wherein the audio controller further comprises output characteristic transmission means for transmitting the output characteristic identified by the output characteristic determination means to a predetermined audio device.

* * * * *